United States Patent [19]

Bowden et al.

[11] 4,317,268

[45] Mar. 2, 1982

[54] PROCESS FOR MAKING A HEATER EXCHANGER

[75] Inventors: Donald R. Bowden; Bruce J. Novell, both of Huntsville, Ala.

[73] Assignee: Solar Limited, Inc., Huntsville, Ala.

[21] Appl. No.: 207,563

[22] Filed: Nov. 17, 1980

Related U.S. Application Data

[60] Division of Ser. No. 64,668, Aug. 8, 1979, which is a continuation-in-part of Ser. No. 836,812, Sep. 26, 1977, abandoned.

[51] Int. Cl.³ .............................................. B23P 15/26
[52] U.S. Cl. .......................... 29/157.3 AH; 165/163; 165/70
[58] Field of Search ................................ 165/70, 163; 29/157.3 AH

[56] References Cited

U.S. PATENT DOCUMENTS

| | | | |
|---|---|---|---|
| 1,852,490 | 4/1932 | Sullivan | 165/163 |
| 1,993,171 | 3/1935 | Hyde | 29/157.3 AH |
| 2,330,844 | 10/1943 | Rover | 165/70 |
| 3,202,210 | 8/1965 | Hughes | 165/179 |
| 3,802,499 | 4/1974 | Garcea | 165/163 |
| 4,065,264 | 12/1977 | Lewin | 165/163 |

FOREIGN PATENT DOCUMENTS

| | | | |
|---|---|---|---|
| 468323 | 9/1950 | Canada | 165/163 |
| 601766 | 9/1933 | Fed. Rep. of Germany | 165/163 |
| 1499286 | 10/1967 | France | 165/70 |
| 811665 | 4/1959 | United Kingdom | 165/163 |

*Primary Examiner*—Francis S. Husar
*Assistant Examiner*—V. K. Rising
*Attorney, Agent, or Firm*—Dowell & Dowell

[57] ABSTRACT

A heat exchanger having an outer shell which is long as compared with its diameter and having a helical double-walled finned volute member which is wound to a small diameter around a core member, the proportions being such that the fins on the double-walled member touch the core on the inside of the wound convolutions and touch the shell on the outside of the wound convolutions. The tube which comprises the outer wall of the double-walled member extends through the shell so that any leakage into the space between the inner and outer tubes of the double-walled tube member will be discharged outside of the shell. The process by which the exchanger is made includes the steps of inserting an inner tube in a length of finned outer tube, winding them into a volute member, inserting a central core member therein, installing these members in a shell member and spinning the shell member closed to seal with the ends of the outer tubing of the volute member.

2 Claims, 7 Drawing Figures

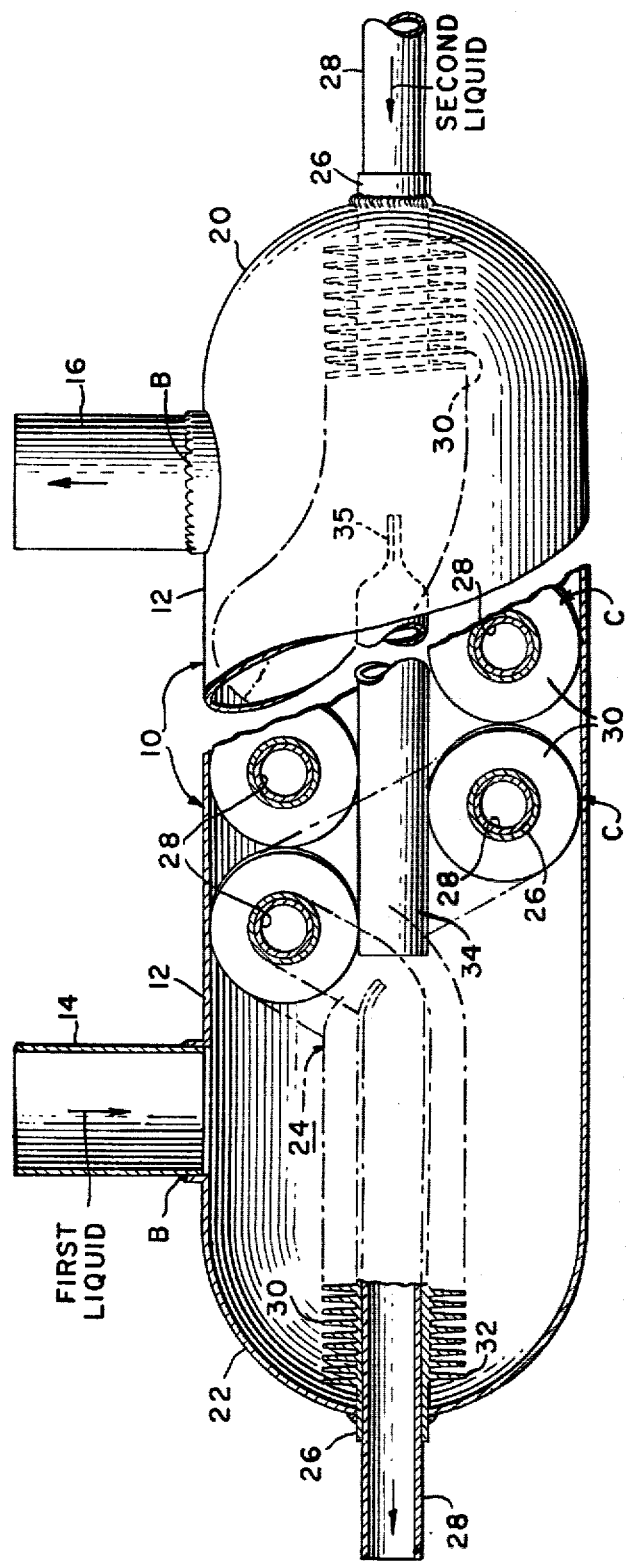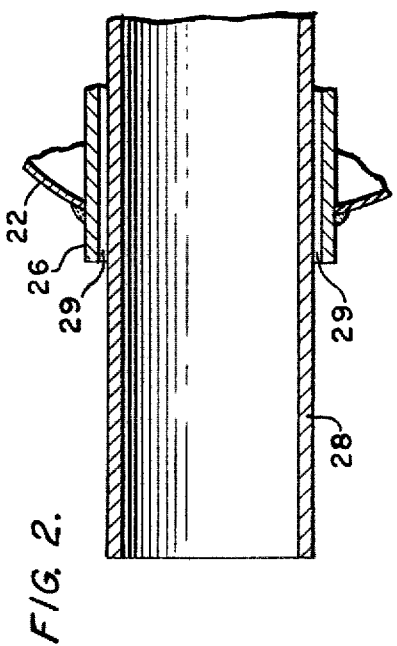

PROCESS FOR MAKING A HEATER EXCHANGERcl FIELD OF INVENTION

This is a division of application Ser. No. 64,668 filed Aug. 8, 1979, which in turn is a continuation-in-part of our copending Ser. No. 836,812, filed Sept. 26, 1977, now abandoned, and relates to improvements in heat exchangers for transferring heat between a first relatively more viscose liquid flowing through the shell of the exchanger and a second relatively less viscose liquid flowing through a convoluted finned tube contained within the shell, and to a process for making such improved heat exchangers.

BACKGROUND AND PRIOR ART

As a result of dwindling energy supplies much effort is being put into perfecting apparatus for collecting solar energy and putting it to use, for example, to heat water for domestic or industrial use or as a heat storing medium. Since solar heat collectors are often exposed to ambient temperatures well below the freezing temperature of water, it is attractive to provide a dual-liquid solar heating system wherein the water flows in one circuit which is protected inside a building or buried, and wherein the system has another circuit in which a non-freezing liquid circulates through a solar collector which is exposed to out-of-doors temperatures. Oil can be used in this exposed circuit, or ethylene glycol, or some other such liquid, although there is more to the selection of the liquid than its antifreeze qualities. For example one must consider its thermodynamic properties such as thermal conductivity, its viscosity when cold, anticorrosion properties, cost, etc. One of the more attractive liquids is silicone oil. However, silicone oil is considerably more viscose than water and therefore tends to form a relatively motionless boundary later, which tends to be broken up by the fins when the oil flows over finned tubes in a heat exchanger. Moreover, silicone oil might contaminate a domestic water supply if a leak were to occur within the heat exchanger. The present invention addresses itself to providing solutions to these, and other problems, by providing an improved heat exchanger structure.

Prior patents known at the present time show heat exchangers of the type having a shell through which one fluid flows and having within the shell a circuitous fluid path extending around a core member and passing a second liquid, examples thereof being shown in Canadian Pat. No. 468,323 to Hill; U.S. Pat. No. 3,802,499 to Garcea, and U.S. Pat. No. 3,092,980 to Rosenschold. The latter two patents show the circuitous path as comprising a helical coil of finned tubing with a core member closing the central opening through the helix.

In one major application for which the present heat exchanger is specifically provided, namely solar energy collection, a double-walled tube must be used as a government-required safety measure to contain the domestic water and separate it from the liquid medium, such as silicone oil which collects heat from the solar panels. A number of patents are known which show straight-tube double-walled structures, for instance, as shown in U.S. Pat. No. 2,187,555 to Flindt, U.S. Pat. No. 2,365,515 to Baudry, and British Pat No. 748,264 to Foster-Wheeler. These double-walled tubes make it possible to guard against contamination of one liquid by the other in case one tube should leak, and they also provide drippage at the end of the outer tube to indicate any such leakage.

In solar heat exchange service, however, the use of double-walled tubing in a heat exchanger is very damaging to its heat transfer rate, particularly so because the temperature of the liquid from the solar panels is not very much higher than the temperature to which the water inside the double-walled tubing is to be heated. In a typical solar installation the medium bringing heat from the solar panels will have a difference in temperature with respect to the water in the volute tubes of only about 40° F. The problem of poor heat transfer occurs because the space between the dual tubes, if sufficient to channel leakage outside the heat exchanger acts as an insulating barrier, and this insulating tendency is intolerable because of the low differential in temperatures between the silicone oil in the outer fluid circuit and the water on the other side of the dual tubing wall. The present invention seeks to minimize the deleterious effect of this insulating space by improving the metal-to-metal physical contact between the tubes as a direct result of winding them into a helical volute of small diameter whereby the tubes are distorted into mutual contact.

The prior patents mentioned above are all of record, with copies supplied, in the parent case of which this disclosure is a C.I.P.

THE INVENTION

The present invention teaches improved structure for a heat exchanger having a heat exchanger shell member with an elongated cylindrical central portion with two axially spaced closed end portions beginning near the zones where ducts enter the shell member, which ducts pass a first liquid through the shell member. Within the shell member there is an axially disposed core member with a double-walled volute member comprising concentrically telescoped tubes wound closely around the core member. The outer tube is finned and the fins lie substantially against the core member and also substantially against the inner periphery of the cylindrical central portion of the shell member. The successive convolutions of this helically wound volute have their fins also in substantial mutual contact so that the maximum number of convolutions are provided for a given length of the core tube member. The convolutions of the volute member lie in the central portion of the shell member, and the tubes then straighten out and extend from the end portions of the shell member. The outer tube of the double-walled heat exchanger member is stripped of fins for the last few inches near its ends, and these ends are soldered or braised to the end portions of the shell member. The outer tube extends through the end portions and stops just outside thereof, and the inner tube continues therebeyond to be connected to a circuit in which the second heat-exchange liquid flows. The entire heat exchanger is made of suitable material such as copper or aluminum, since the material must be soft enough to bend but corrosion-free with respect to the liquids flowing therethrough. The process by which the exchanger is made includes forming a concentric double-walled tube and winding it into a tight helical volute, and then inserting the volute into the tubular shell member which then has its end portions spun inwardly to contact the outer tube to which the end portions are braised. The ratio of the length of the volute to its outer diameter in this embodiment is about 8:1.

It is the general object of this invention to provide a process for manufacturing such a heat exchanger, and to provide an improved heat exchanger capable of efficient use in a solar water heating system wherein oil flows in a circuit including solar heat collector means connected in series with the outer shell member of the heat exchanger, the oil flowing around a finned double-walled water-carrying tube in the exchanger. A major improvement resides in increasing the rate of heat transfer through the double-walled tubing achieved by bending the outer and inner tubing to distort it and thereby provide increased mutual surface contact. It is estimated that the improvement in heat transfer rate is in the vicinity of about 30%.

A more specific object of the invention is to provide a well proportioned heat exchanger wherein the double-walled finned tube member is helically wound around a core tube member to form a volute whose diameter is made small as compared with its length and as compared with the tubing diameter. In the presently illustrated embodiment, the diameter of the core member ranges from a dimension which is about the same as the diameter of the finned tube minus the fins to a dimension which is about twice that diameter. By providing an elongated heat exchanger of small outside diameter the length of tubing used is kept to a minimum while the rate of flow of the viscose oil through its fins is elevated so as to reduce the tendency of the oil to form non-flowing boundary layers in some areas between the fins. The convolutions are wound about the core tube, serving as an axially disposed plug member, and fit thereagainst tightly enough that the inside periphery of the volute formed by the edges of the fins substantially lies against and contacts the core tube. The central cylindrical portion of the shell member is of such internal diameter that the outer periphery of the volute comprising the edges of the fins substantially lies against and contacts the shell member, whereby the flow of the first liquid in the shell member can only be through the spaces between the fins, there being no direct path for flow inside of, or outside of, the peripheries of the volute.

Another object of the invention is to place successive convolutions of the finned tube volute in very close proximity with each other whereby a maximum number of convolutions is obtained per unit length of volute, thereby increasing the area of the active heat exchange surfaces between the liquids, and at the same time minimizing the incremental temperature change from one convolution to the next.

A further object of the invention is to provide a heat exchanger as set forth above wherein the core tube member is almost sealed at one end to prevent substantial flow of the first liquid therethrough, rather than through and between the finned convolutions. The core tube member may have a small opening allowing enough flow of liquid to purge air from within the core tube when first placed in service.

It is a further major object of the invention to provide a heat exchanger wherein the second liquid contained within the volute is domestic water, for instance from city water mains, which water within the volute is required by the government to be protected from contamination by the other liquid in the exchanger by using a double-walled tube member. This double-walled tube comprises a continuously seamless outer tube having fins formed on the outside thereof, and a concentric inner water-carrying tube which is a snug fit in the outer tube but not sealed thereto. In order to provide the required protection against contamination, and also an indication of any leakage, both ends of both tubes pass through the end portions of the heat exchanger shell so that they terminate beyond the shell. The outer tube only is sealed to the shell where it passes therethrough. The inner tube extends beyond the termination of the outer tube ends, the inner tube being then connected to suitable external circuits, for example to hot water storage means. This construction assures that any leakage of either liquid into the space between the inner and outer tubes will discharge outside the heat exchanger, rather than inside thereof.

Other objects and advantages of the invention will become apparent during the following discussion of the drawings which show a preferred embodiment of the invention.

THE DRAWINGS

FIG. 1 is a side elevation view of a heat exchanger according to the invention partly in cross-section;

FIG. 2 is an enlarged fragmentary sectional view showing part of the left end portion of the heat exchanger where the inner and outer tubes exit therefrom;

Figure 4:
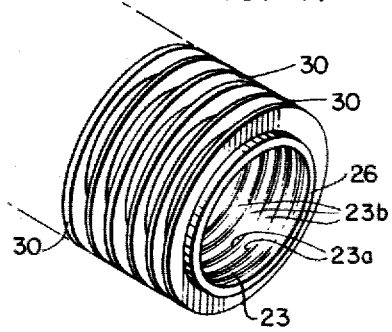
Figure 5:
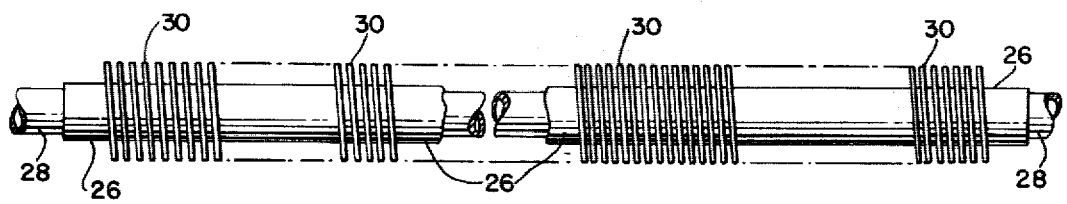
Figure 6:
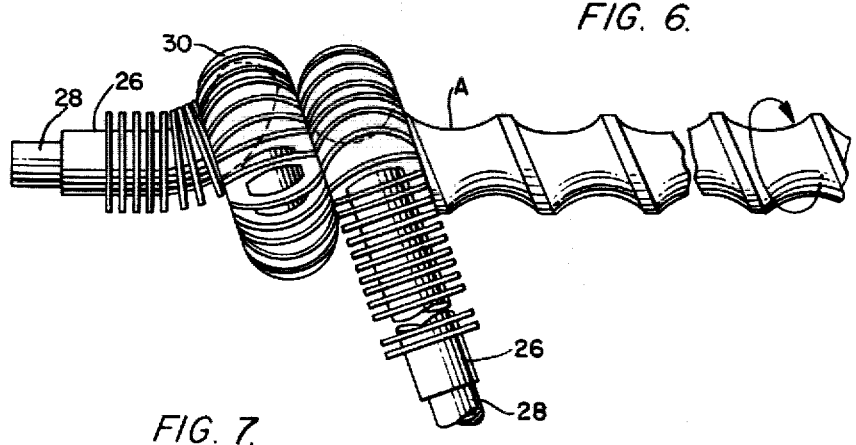
Figure 7:
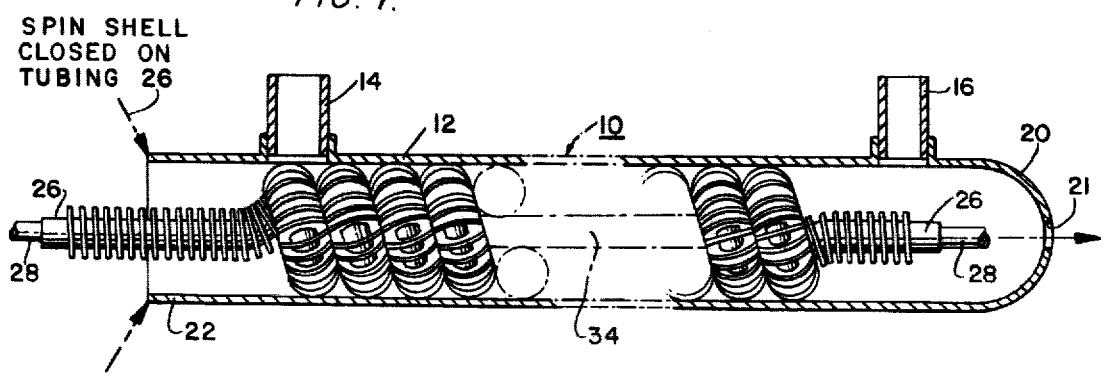

FIG. 4 is an enlarged perspective view of a preferred type of finned tubing used as the outer tubing; and FIGS. 5, 6 and 7 are views illustrating major steps in the process of making the heat exchanger of the present invention, respectively showing the insertion of a length of inner tubing into a length of outer tubing, the winding of the double-walled tubing into a helical volute member, and the inserting of the helical volute member with the core in place therein into the shell member which is then closed at its ends.

Referring now to the drawings, FIG. 1 shows an embodiment of a heat exchanger which is illustrative of the present invention and which comprises a heat exchanger shell member 10 having a central portion 12 which extends between an inlet duct 14 and a discharge duct 16, the central portion 12 being cylindrical. The central portion is provided with two hemispherical end portions 20 and 22 which are, in the manufactured form of the heat exchanger, one piece with the central portion 12, the end portions 20 and 22 being spun inwardly while rotating the heat exchanger on a lathe. The inlet duct 14 and the outlet duct 16 are attached, as by soldering or braising B to the upturned edges of several holes in the shell member 10 which are made by inserting a die through a smaller hole and then pulling the edges upwardly, a process which is well known in the fabrication of sheet metal structures.

Inside the shell member 10 there is a double-walled volute member 24 comprising an outer finned tube 26 telescopically receiving an inner tube 28. The outer tube is provided with fins 30 which extend therefrom along most of the length of the outer tube 26, except that the end portions beyond the last fin 32 are free of fins and extend cleanly through holes 21, FIG. 7, in the centers of the end portions 22 and 20 to a point adjacent to, and just outside of, the shell member.

As can be seen best in FIGS. 2 and 3, the inner tube 28 is slightly smaller than the outer tube 26 so as to leave a small vent space 27 and 29 between the two tubes for the purpose hereinafter discussed.

A core member 34 in the form of a tube extends axially through most of the length of the central portion 12 of the shell 10. The core tube 34 in the illustrated structure has an outer diameter which falls within a range extending from about one to two times the outer diameter of the outer tube 26 with the fins removed therefrom. The double-walled volute member, comprising the tubes 26 and 28 and the fins 30, fits around the core tube 34 which comprises a central plug closing the aperture through the center of the convolutions C which are located closely adjacent to one another with the fins 30 substantially touching. The convolutions are wound tightly enough to leave a central aperture defined by the inner peripheries of the fins which will snugly receive the core tube 34 so that the inner peripheries of the fins rest substantially on the core tube member. The inside diameter of the shell member in the vicinity of the central portion 12 between the ducts 14 and 16 is selected such that the outer peripheries of the convolutions comprising the outer edges of the fins rests substantially against the inner surface of the central portion 12. This is done in an effort to force the relatively viscose liquid which enters the inlet duct 14 to travel mostly by circulating between fins before it departs through the outlet duct 16.

The liquid which passes through the main shell member is referred to in the specification and claims as being the first liquid, and is generally the more viscose of the two liquids, i.e. silicone oil. The core member 34 is pinched together at one end as shown at 35 in FIG. 1, and the pinching may be sufficient to actually seal the core member against all flow through it, or else a small path may be allowed to remain in the vicinity of the pinched end 35 so as to permit the liquid flowing through the central portion of the shell member to pass through the core member 34 at a very slow rate, and thereby provide sufficient flow only to keep the liquid within the core member 34 changed and freshened, and to purge air from inside the core member which may become trapped therein at the time that the installation is first placed in service.

The double-walled volute member comprising the tubes 26 and 28 carries the liquid which is referred to in the claims and in the specification as being the second liquid, and the direction of flow of the second liquid through the tube 28 is such that it will be counter to the direction of axial movement of the first liquid through the central portion 12 of the member shell 10. In this way, the warmest liquids are always in contact with each other and the coolest liquids are always in contact with each other, and the temperature differential between these two liquids is made more nearly constant. This concept of counter flow is of course very well known in the heat exchange art and is not claimed as being novel in the present disclosure.

It should be particularly noted that by bringing the ends of the tube 26 outside of the heat exchanger shell member 10 before terminating the ends, any leakage which gets through either tube into the bent space 29 will always be discharged outside of the heat exchanger. This provides visual indication of leakage to warn the operator of the system if such leakage should occur, and it also insures that any leakage will discharge externally of the heat exchanger and will cause no contamination of either fluid by the other fluid in the heat exchanger. In particular, in a system where fresh water is being used from the city mains, for instance in a domestic hot water system, the first liquid is prevented from contaminating the domestic water if a leak occurs. This is an important safety feature which is now required by government regulations, especially where the first liquid comprises oil, antifreeze, or some other non-freezing medium which is connected to flow between the ducts 14 and 16 and within an external solar heat collector panel system which might be subject to freezing during severe weather if water were used as the first liquid.

Figure 3:
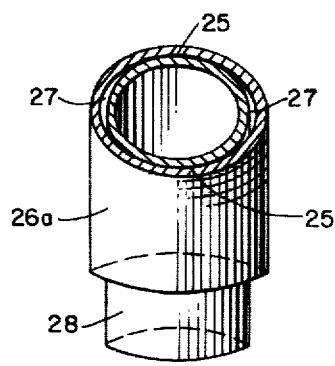
FIG. 3 is an enlarged sectional view through a piece of bent double-walled tubing showing how the inner and outer tubings are distorted into mutual contact as a result of bending.

Referring now to FIG. 3, this figure shows outer and inner tubes 26a and 28, there being no fins shown on the outer tube 26a. In FIG. 3, both of the tubes are bent on the same arc as the tubes 26 and 28 of the helical volute as shown in FIG. 1. FIG. 3 is intended to illustrate the manner in which an outer tube 26a and an inner concentric tube 28 are distorted into elliptical cross-sections in which the tubes are tightly pressed together in two zones 25 of mutual contact, but leave a space between the tubes in two other zones 27 of non-contact. Thus, if the relative inner and outer diameters of the tubes are carefully selected, a large zone of metal-to-metal surface contact between the two tubes will result when they are wound into a tight helix resembling the volute 24 of FIG. 1.

The heat exchanger in FIG. 1 is about three feet long and about three inches in diameter, and the volute itself uses about fourteen feet of the tubing 26 and 28. Most of this length is wound into a helix as shown in FIG. 6, but it will be readily appreciated that it would be almost impossible to push fourteen feet of smaller tubing 28 into fourteen feet of larger tubing 26 unless there is a substantial initial clearance between them. Such initial clearance, although necessary to permit assembly of the tubing in the first place, would be very damaging to the heat transfer characteristics between the inner and outer tubing 28 and 26. However, when the tubing is subsequently wound into the helical form of the volute 24, the two tubes are thereby distorted into a high degree of mutual surface contact. The cross-sectional view appearing at the top of FIG. 3 is taken in a plane normal to the axis of the tubing at that point, and shows that the cross-section through the wound tubing is at every point elliptical. The tubing therefore touches in the vicinity of the reference characters 25 but is spaced in the vicinity of the reference characters 27 so that any leakage that occurs through one of the tubes will have a space 27 through which the liquid can be discharged outwardly of the heat exchanger at the space 29 as shown in FIG. 2. It would be appropriate to provide a difference between the outside diameter of tube 28 and the inside diameter of tube 26a of at least seven thousandths of an inch when assembling them before bending.

Actually, the maintenance of a continuous leakage path which communicates with the discharge spaces 29 is easily accomplished in the heat exchangers as actually manufactured, because they use an outer finned tubing of the type shown in FIG. 4. This finned tubing is a standard manufactured product which is made by die forming a thicker walled seamless copper or aluminum tubing so as to make the fins 30 extrude upwardly, leaving a thinner walled continuous tubing body 26 as shown in FIG. 4. As a result of die forming the fins 30 on a thicker walled tube, the inner surface of the tube is itself helically undulated as shown at 23 in FIG. 4, leaving alternate depressions 23a and ridges 23b which have the same pitch as the helical fins 30 formed on the outside of the tube. These alternate ridges and depressions are very pronounced in the tubing and leave a continuous helical passage within tubing 26 for the flow of a liquid to communicate with the space 29. This is the type of tubing which the applicant uses in the present invention, and when the tubes are being telescoped together there is a difference of about five thousandths of an inch between the inner diameter of tube 26 and the outer diameter of tube 28. However, when the helical volute is wound using these two tubes, the outer tubing distorts inwardly against the inner tubing to provide an elliptical cross-section resembling the one shown at the top of FIG. 3, but wherein the ridges 23b are distorted against, and actually distort, the surface of the tubing 28, particularly at locations corresponding with the zones 25 of FIG. 3. However, the depressions 23a are not closed against the inner tubing 28, whereby the helical passsageway is maintained. In all heat exchangers manufactured according to this disclosure, the continuity of the liquid path 29 from one end to the other through the wound double-walled volute is tested by passing a liquid therethrough before the heat exchanger is accepted for use in an actual installation.

Thus, the applicant meets the government requirement of a double-walled volute structure while at the same time providing a high degree of metal-to-metal contact between the inner and outer tubing 28 and 26, the present disclosure having shown how this contact is obtainable using either the finned tubing 26 of FIG. 4 having an undulating inner surface 23, or alternatively using a non-undulating inner surface type of tube 26a, either finned or unfinned, as shown in FIG. 3. The nominal inside diameter of the smooth-walled tube 26a should be somewhat larger than the minimum diameter of the undulating tube 26 to ensure the continuity of open spaces 27 between the tubes once they have been wound into helical form.

FIGS. 5, 6 and 7 illustrate steps of the process by which the present heat exchanger is made. An outer shell 10 as shown in FIG. 7 is first partially formed using cylindrical tubing having the diameter of the central portion 12 of the shell member 10, a pair of ducts 14 and 16 having been installed in the manner related above near the beginning of the description of FIG. 1. One end portion 20 of the shell is spun nearly closed and provided with a hole 21 which is of such diameter as to snugly receive the end of the tubing 26, from which the fins have been removed.

Next, two lengths of tubing 28 and 26 are telescoped together as shown in FIG. 5 by inserting the inner tube 28 into the outer tube 26, leaving the last few inches of the outer tubing 26 free of fins so that it can pass through the hole 21 in the end of the heat exchanger shell member 10 as shown in FIG. 7. The heat exchanger currently manufactured is three feet long and three inches in diameter, and fourteen feet of double-walled tubing as shown in FIG. 5 is required to wind the helical volute for insertion into the heat exchanger shell 10.

The tubing is telescoped together as shown in FIG. 5, and then the tubing has one end portion shaped as shown toward the left end of FIG. 6. The tubing near the shaped end is next secured to the arbor A of a lathe as shown in FIG. 6, the arbor being grooved with a helical pattern having the same pitch as the helical volute 24 to be wound. The lathe then winds the volute as shown in FIG. 6, after which the other end of the volute will be shaped so that the two volute ends extend in axially opposite directions as shown in FIG. 7. However, before the second end of the volute is shaped the core tube member 34 is inserted through the central aperture of the helical volute, the central aperture being defined by the inner peripheral edges of the fins 30.

Finally, the helical volute is inserted into the open end 22 of the shell member 10 as shown in FIG. 7 so that the tubing in the vicinity of the reference character 26 at the right hand end of the volute passes through the hole 21 to which it is subsequently sealed for instance as by soldering or braising as shown in FIGS. 1 and 2. The heat exchanger shell 10 is then inserted in a lathe, and the open end 22 is spun closed against the tubing 26 at the left hand end of the helical volute and sealed thereto. The heat exchanger is thus completed.

This invention is not to be limited to the exact embodiment, or dimensions, or to the exact steps of the process by which the invention is described, for obviously changes may be made therein within the scope of the claims.

What is claimed is:

1. The process of making a heat exchanger having an outer shell member for carrying a first liquid and having a double-walled volute member having an outer finned tube and an inner tube passing through the outer tube and carrying a second liquid for heat exchange with said first liquid, including the steps of:
   (a) inserting a length of said inner tube into a length of said outer tube to form a double-walled member with enough space between the tubes to pass liquid between them;
   (b) winding the double-walled member into a tight helical volute in which the fins of adjacent convolutions substantially touch each other and in which the aperture through the center of the volute has a diameter no greater than twice the diameter of the outer tube minus its fins, and providing unwound end portions of the double-walled member which extend from the volute;
   (c) inserting a core member into the space through the center aperture of the volute in contact with the fins to substantially close the space;
   (d) inserting said volute into a tubular shell comprising said outer shell member and having an internal diameter which closely fits against the edges of the fins at the outer periphery of the volute, and extending said end portions of the double-walled member from the shell;
   (e) providing inlet and outlet ducts through the shell for conducting said second liquid; and
   (f) closing the ends of the shell and sealing the outer tubing to the shell where it passes therethrough.

2. The process as claimed in claim 8, wherein the steps include extending the unwound end portions of the double-walled member substantially axially from the helically wound volute and in opposite directions; and closing the ends of the tubular shell by spinning the shell at its ends to close it into contact with said end portions of the double-walled member prior to sealing the outer tubing to the spun portions of the shell.

* * * * *